(12) United States Patent
Kim et al.

(10) Patent No.: US 12,695,032 B2
(45) Date of Patent: Jul. 28, 2026

(54) MULTILAYER ELECTRONIC COMPONENT

(71) Applicant: SAMSUNG ELECTRO-MECHANICS CO., LTD., Suwon-si (KR)

(72) Inventors: Hwi Dae Kim, Suwon-si (KR); Jea Yeol Choi, Suwon-si (KR); Young Ghyu Ahn, Suwon-si (KR); Soo Hwan Son, Suwon-si (KR); Won Chul Sim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 111 days.

(21) Appl. No.: 18/680,034

(22) Filed: May 31, 2024

(65) Prior Publication Data

US 2025/0054700 A1 Feb. 13, 2025

(30) Foreign Application Priority Data

Aug. 9, 2023 (KR) ........................ 10-2023-0103998

(51) Int. Cl.
 *H01G 4/30* (2006.01)
 *H01G 4/008* (2006.01)
 (Continued)

(52) U.S. Cl.
 CPC .............. *H01G 4/30* (2013.01); *H01G 4/008* (2013.01); *H01G 4/012* (2013.01); *H01G 4/12* (2013.01); *H01G 4/232* (2013.01)

(58) Field of Classification Search
None
See application file for complete search history.

(56) References Cited

U.S. PATENT DOCUMENTS 10,431,381 B2 * 10/2019 Cho ........................ H01G 4/12
2015/0041199 A1 * 2/2015 Lee ........................ H01G 4/005
 361/306.3
(Continued)

FOREIGN PATENT DOCUMENTS

JP 6309313 B2 3/2018
JP 2020-119993 A 8/2020
(Continued)

*Primary Examiner* — Dion R. Ferguson
(74) *Attorney, Agent, or Firm* — MORGAN, LEWIS & BOCKIUS LLP

(57) ABSTRACT

A multilayer electronic component includes a body including a dielectric layer and an internal electrode alternately disposed with the dielectric layer in a first direction, and having a first surface and a second surface opposing each other in the first direction, a third surface and a fourth surface connected to the first and second surfaces and opposing each other in a second direction, a fifth surface and a sixth surface connected to the first to fourth surfaces and opposing each other in a third direction, and an external electrode disposed on the body. The internal electrode is connected to the external electrode through a lead-out portion, the external electrode includes first to fourth external electrodes spaced apart from each other, and includes a first connection electrode connecting the first and third external electrodes, and the first connection electrode includes a conductive material.

20 Claims, 11 Drawing Sheets

(51) Int. Cl.
    *H01G 4/012*       (2006.01)
    *H01G 4/12*        (2006.01)
    *H01G 4/232*      (2006.01)

(56)           References Cited

U.S. PATENT DOCUMENTS

| | | | |
|---|---|---|---|
| 2015/0325370 A1* | 11/2015 | Lee | H01G 4/1227 |
| | | | 361/275.4 |
| 2018/0144868 A1* | 5/2018 | Park | H01G 4/30 |
| 2019/0027312 A1* | 1/2019 | Muramatsu | H01G 4/12 |
| 2020/0234883 A1* | 7/2020 | Muramatsu | H01G 4/008 |
| 2024/0282521 A1* | 8/2024 | Kim | H05K 1/181 |
| 2025/0054700 A1* | 2/2025 | Kim | H01G 4/30 |

FOREIGN PATENT DOCUMENTS

| | | |
|---|---|---|
| KR | 10-2014-0126083 A | 10/2014 |
| KR | 10-2015-0127441 A | 11/2015 |
| KR | 10-2077617 B1 | 2/2020 |
| KR | 10-2024-0129828 A | 8/2024 |

* cited by examiner

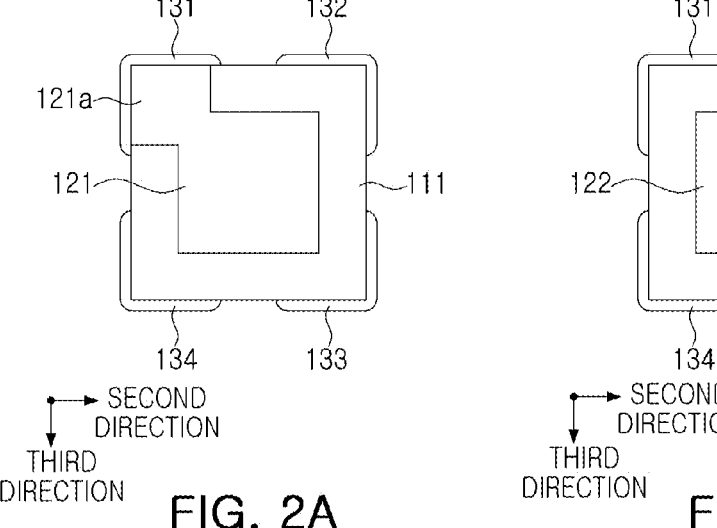
FIG. 2A
FIG. 2B
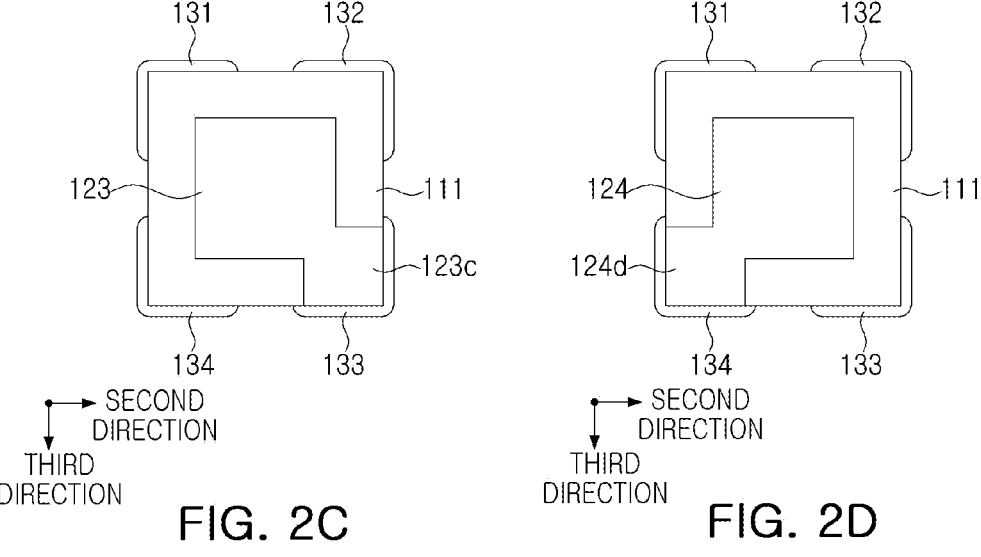
FIG. 2C
FIG. 2D

FIRST
DIRECTION

SECOND
DIRECTION

THIRD
DIRECTION

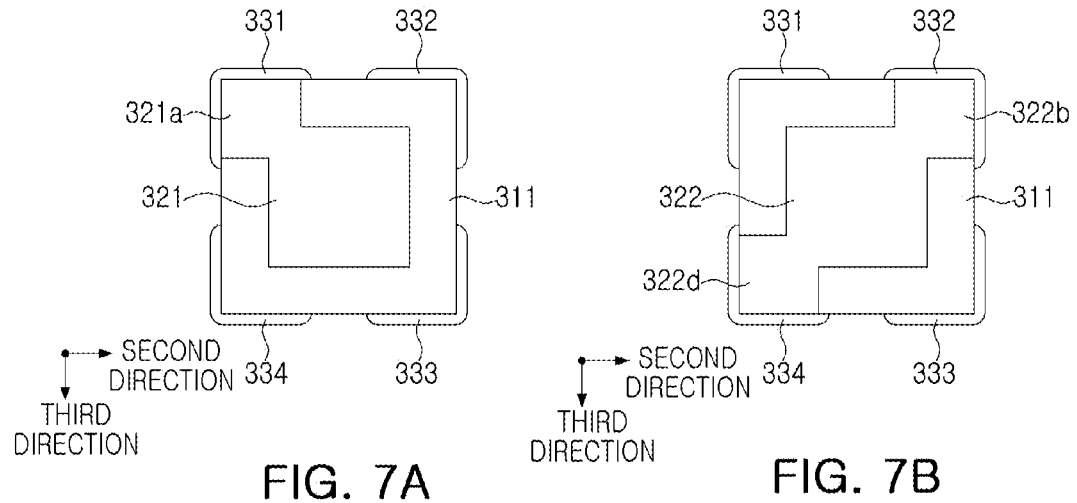
FIG. 7A                                    FIG. 7B
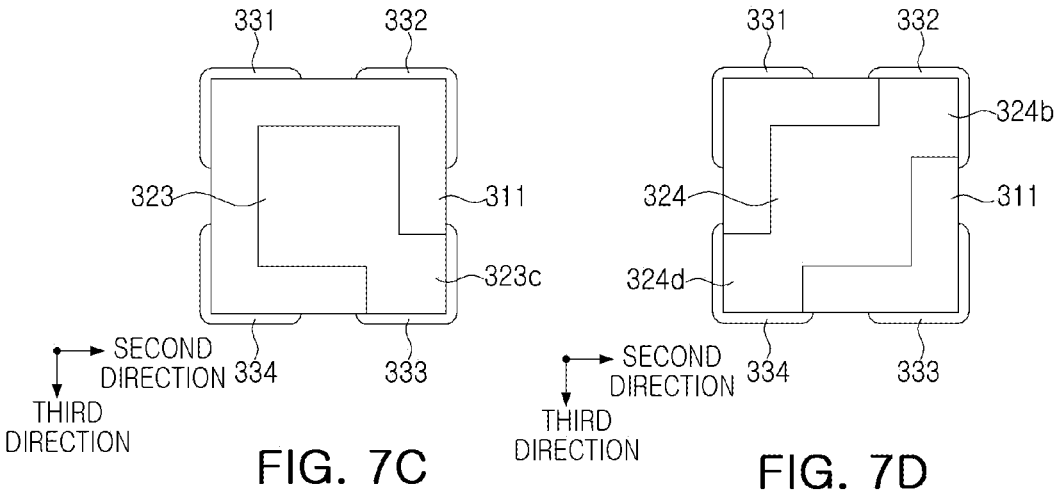
FIG. 7C                                    FIG. 7D

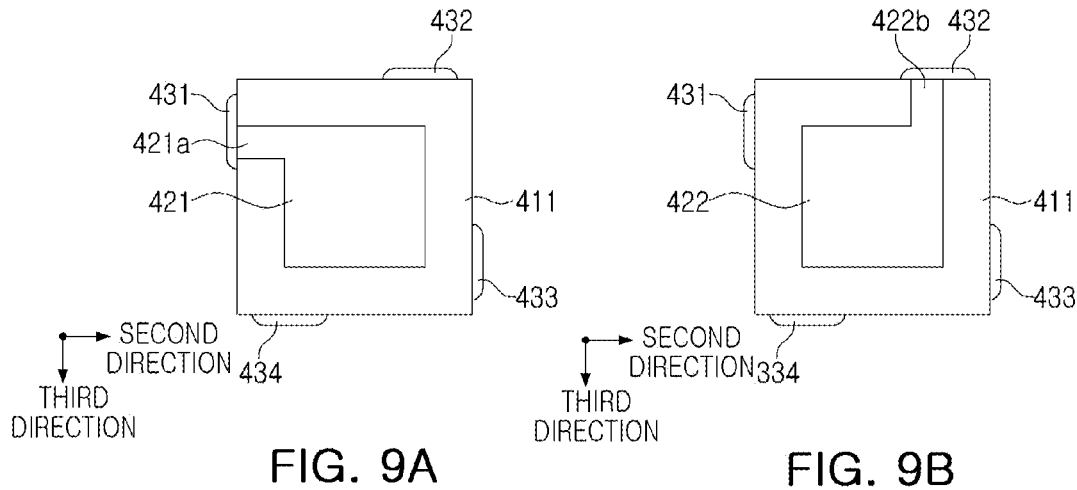
FIG. 9A
FIG. 9B
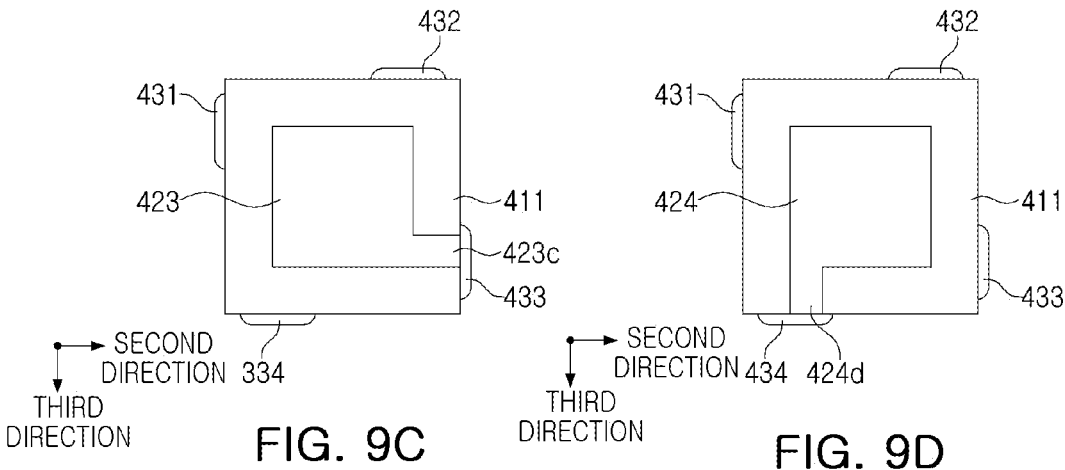
FIG. 9C
FIG. 9D

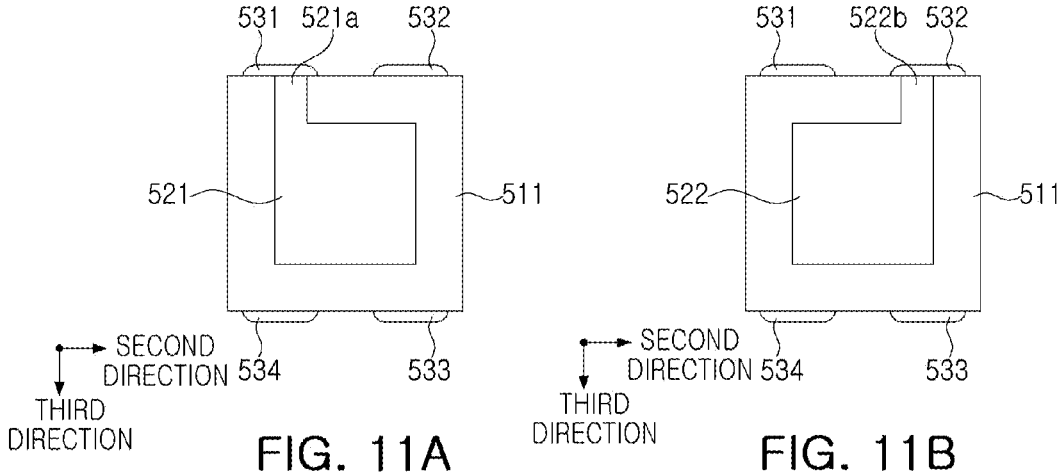
FIG. 11A
FIG. 11B
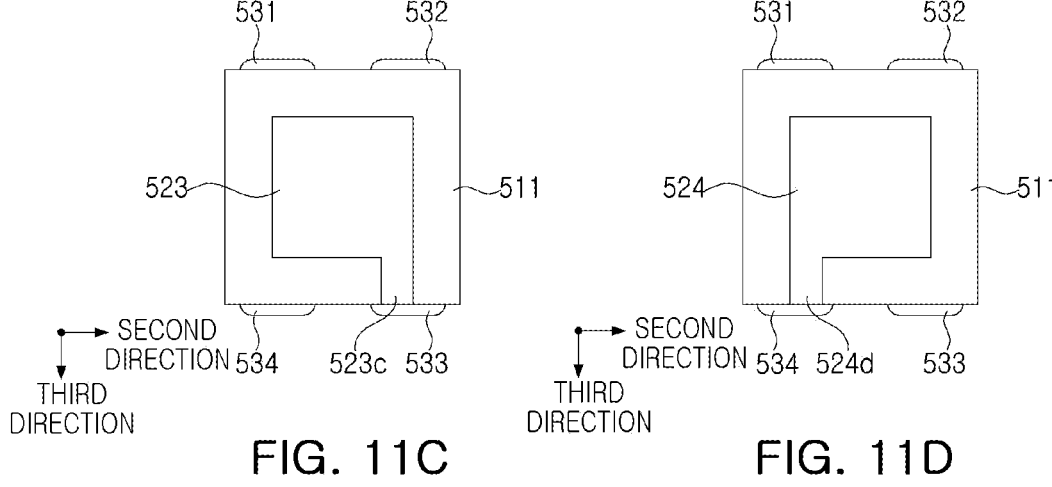
FIG. 11C
FIG. 11D

MULTILAYER ELECTRONIC COMPONENT

CROSS-REFERENCE TO RELATED APPLICATION(S)

This application claims benefit of priority to Korean Patent Application No. 10-2023-0103998 filed on Aug. 9, 2023 in the Korean Intellectual Property Office, the disclosure of which is incorporated herein by reference in its entirety.

TECHNICAL FIELD

The present disclosure relates to a multilayer electronic component.

BACKGROUND

Multilayer Ceramic Capacitors (MLCCs), as multilayer electronic components, are chip-type condensers mounted on printed circuit boards of various electronic products, such as imaging devices, for example, liquid crystal displays (LCDs) and: plasma display panels (PDPs), computers, smartphones, mobile phones and the like, and serving as charging or discharging electricity.

Such multilayer ceramic capacitors may be used as components in various electronic devices due to a small size, high capacitance, and easiness of mounting. As various electronic devices such as computers and mobile devices are miniaturized and have higher output, the demand for miniaturization and higher capacitance for multilayer ceramic capacitors is increasing.

On the other hand, MLCCs are also widely used for decoupling to remove noise from electrical signals within a set due to excellent high-frequency characteristics (low ESL) thereof.

In addition, to prevent noise in high-speed integrated circuits (IC), Land Side Capacitor (LSC) may be applied adjacent to the IC, and LSC is known to require low thickness and high frequency characteristics. To reduce ESL, it is important to significantly reduce the number of magnetic flux linkages per unit current in the high frequency region. To this end, various methods are being used to prevent this problem, such as controlling the formation and structure in a manner of significantly reducing the current loop or disposing internal and external electrodes in a direction that may cancel out the magnetic field.

As mentioned above, the LSC is generally disposed below the IC substrate, and thus has a low thickness and requires low ESL characteristics. At this time, the LSC is mounted in the place from which the solder ball was removed at the bottom of the substrate, and LICC type capacitors are mainly used, but the need for capacitors with a square form-factor is gradually increasing.

SUMMARY

An aspect of the present disclosure is to facilitate measurement of capacitance of multilayer electronic components.

An aspect of the present disclosure is to improve mechanical strength of multilayer electronic components.

An aspect of the present disclosure is to distinguish the appearance of multilayer electronic components.

An aspect of the present disclosure is to provide a multilayer electronic component having improved high-frequency characteristics (low ESL).

According to an aspect of the present disclosure, a multilayer electronic component includes a body including a dielectric layer and an internal electrode alternately disposed with the dielectric layer in a first direction, and having a first surface and a second surface opposing each other in the first direction, a third surface and a fourth surface connected to the first and second surfaces and opposing each other in a second direction, a fifth surface and a sixth surface connected to the first to fourth surfaces and opposing each other in a third direction; and an external electrode disposed on the body. The internal electrode is connected to the external electrode through a lead-out portion, the external electrode includes first to fourth external electrodes spaced apart from each other, and includes a first connection electrode connecting the first and third external electrodes, and the first connection electrode includes a conductive material.

According to an aspect of the present disclosure, a multilayer electronic component includes a body including a dielectric layer and an internal electrode alternately disposed with the dielectric layer in a first direction, and having a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and an external electrode disposed on the body. The internal electrode is connected to the external electrode through a lead-out portion, and the external electrode includes first to fourth external electrodes spaced apart from each other, a first connection electrode connecting the first and third external electrodes, and a second connection electrode connecting the second and fourth external electrodes.

According to still another aspect of the present disclosure, a multilayer electronic component includes a body including a dielectric layer and an internal electrode alternately disposed with the dielectric layer in a first direction, and having a first surface and a second surface opposing each other in the first direction, a third surface and a fourth surface connected to the first and second surfaces and opposing each other in a second direction, a fifth surface and a sixth surface connected to the first to fourth surfaces and opposing each other in a third direction; and an external electrode disposed on the body. The internal electrode is connected to the external electrode through a lead-out portion, the external electrode includes first to fourth external electrodes spaced apart from each other, and includes a first connection electrode connecting the first and third external electrodes, and the first connection electrode extends between the first and third external electrodes in a first diagonal direction with respect to the third to sixth surfaces of the body.

BRIEF DESCRIPTION OF DRAWINGS

The above and other aspects, features, and advantages of the present disclosure will be more clearly understood from the following detailed description, taken in conjunction with the accompanying drawings, in which:

FIGS. 2A, 2B, 2C and 2D schematically illustrate a cross-sectional view of an internal electrode including a lead-out portion according to an embodiment;

FIGS. 7A, 7B, 7C and 7D schematically illustrate cross-sectional views of internal electrodes including lead-out portions according to another embodiment;

FIGS. 9A, 9B, 9C and 9D schematically illustrate cross-sectional views of an internal electrode including a lead-out portion according to another embodiment;

FIGS. 11A, 11B, 11C and 11D schematically illustrate cross-sectional views of internal electrodes including lead-out portions according to another embodiment.

DETAILED DESCRIPTION

Figure 1:
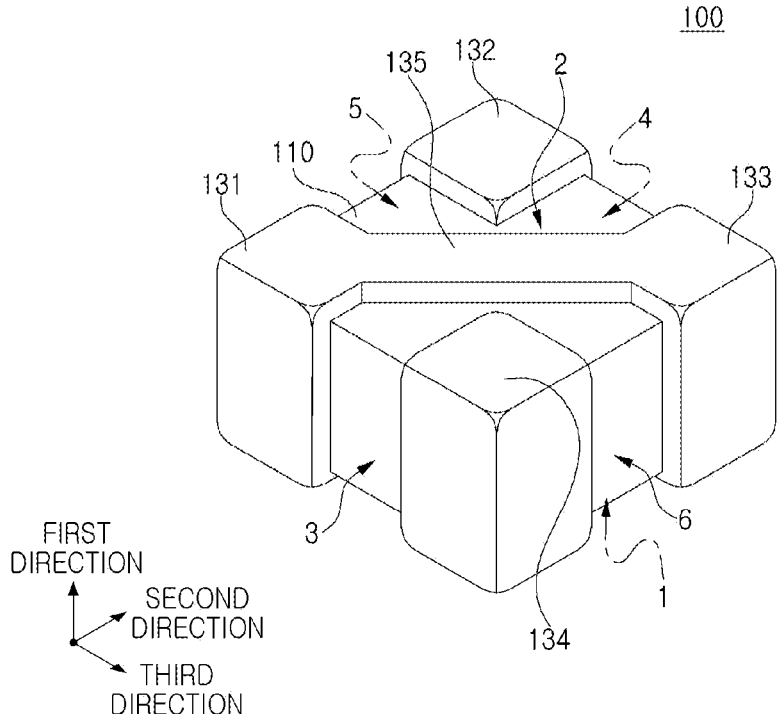
FIG. 1 schematically illustrates a perspective view of a multilayer electronic component according to an embodiment.

Hereinafter, embodiments of the present disclosure will be described with reference to detailed embodiments and accompanying drawings. However, the embodiments of the present disclosure may be modified in many different forms, and the scope of the present disclosure is not limited to the embodiments described below. In addition, the embodiments of the present disclosure are provided to more completely describe the present disclosure to those skilled in the art. Therefore, the shapes and sizes of elements in the drawings may be exaggerated for clearer explanation, and elements indicated by the same reference numerals in the drawings are the same elements.

In addition, to clearly describe the present disclosure in the drawings, parts irrelevant to the description are omitted, and the size and thickness of each component illustrated in the drawings are arbitrarily illustrated for convenience of description, and thus, the present disclosure is not necessarily limited to the illustrated. Also, components having the same function within the scope of the same concept are described using the same reference numerals. Furthermore, throughout the specification, when a certain component is said to "include," it means that it may further include other components without excluding other components unless otherwise stated.

In the drawing, the first direction may be defined as the stacking direction or the thickness (T) direction, the second direction may be defined as the length (L) direction, and the third direction may be defined as the width (W) direction.

FIG. 1 schematically illustrates a perspective view of a multilayer electronic component according to an embodiment.

FIGS. 2A to 2D schematically illustrate a cross-sectional view of an internal electrode including a lead-out portion according to an embodiment.

Figure 3A:
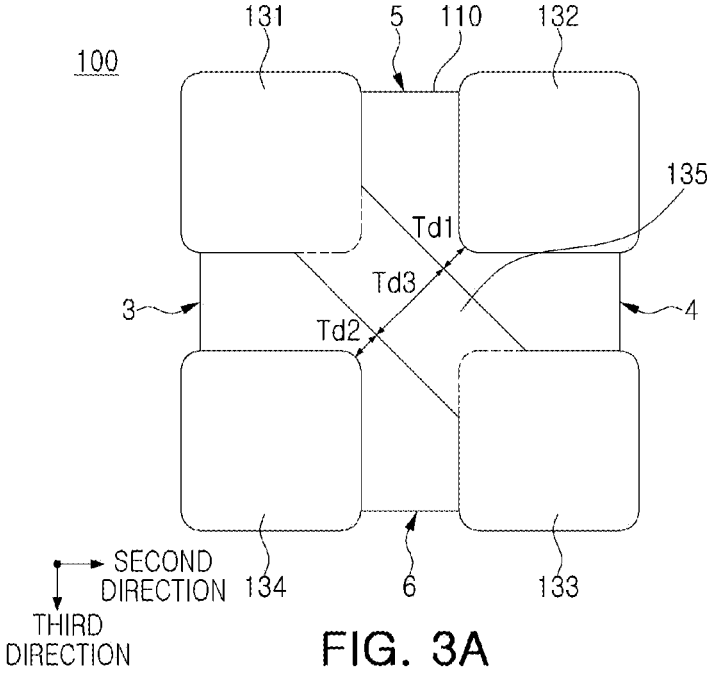
FIG. 3A schematically illustrates a top view of an embodiment, and FIG. 3B schematically illustrates a bottom view of an embodiment.
Figure 3B:
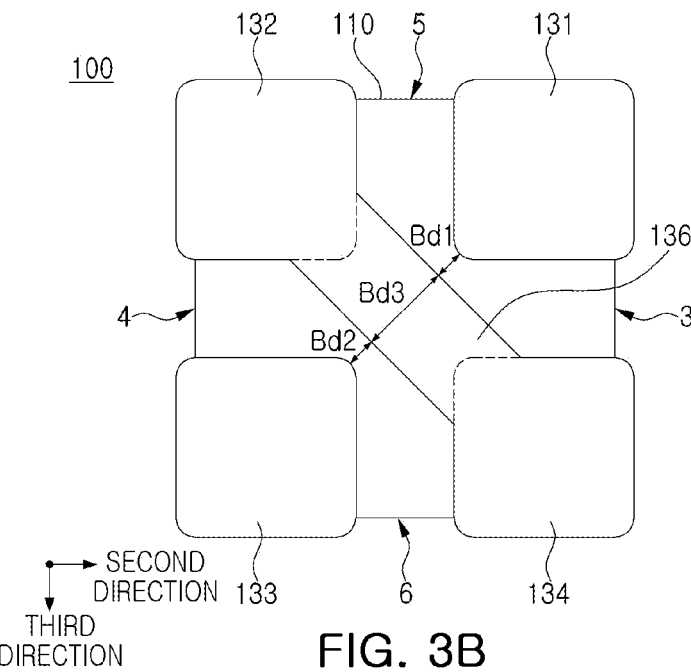

FIG. 3A schematically illustrates a top view of an embodiment, and FIG. 3B schematically illustrates a bottom view of an embodiment.

Figure 4:
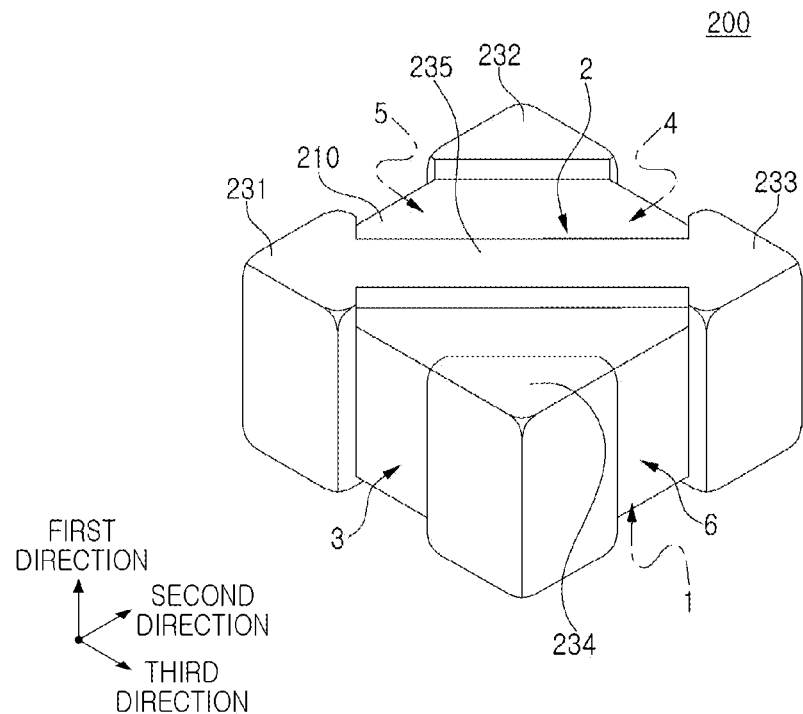
FIG. 4 schematically illustrates a perspective view of a multilayer electronic component according to another embodiment.

FIG. 4 schematically illustrates a perspective view of a multilayer electronic component according to another embodiment.

Figure 5A:
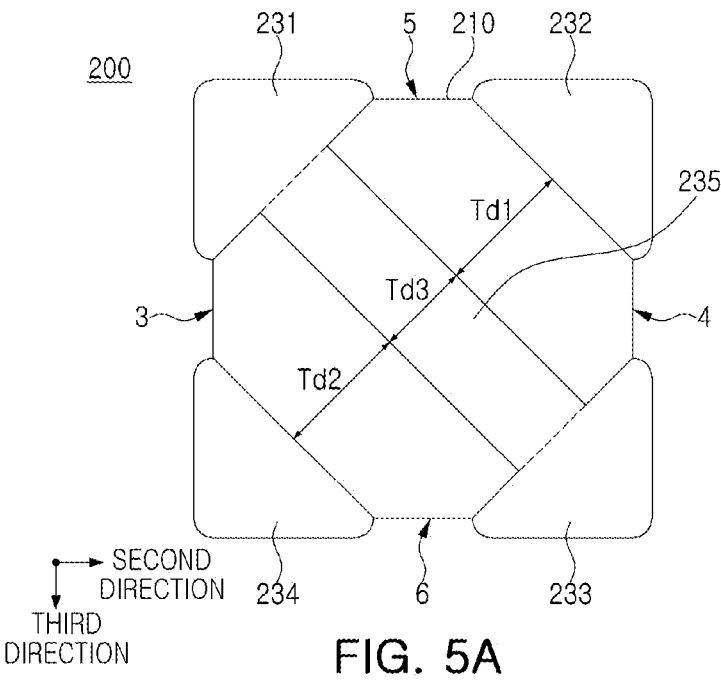
FIG. 5A schematically illustrates a top view of another embodiment, and FIG. 5B schematically illustrates a bottom view of another embodiment.
Figure 5B:
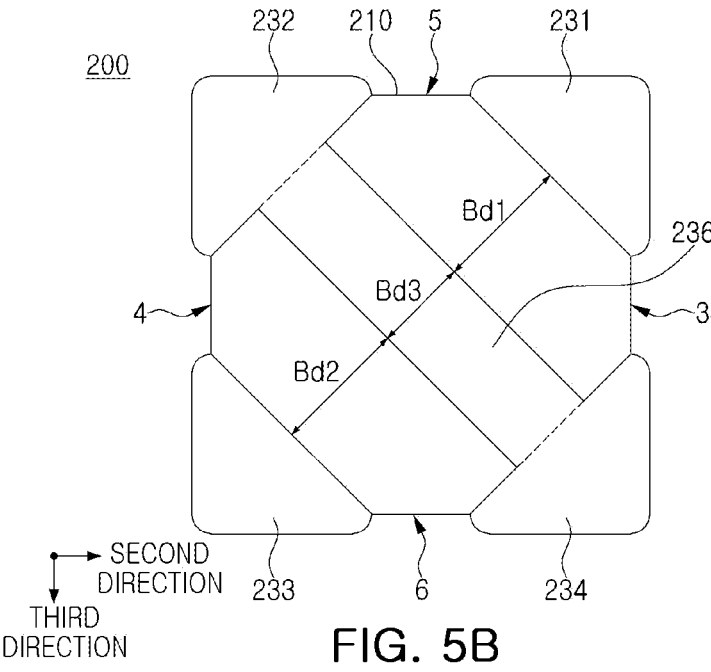

FIG. 5A schematically illustrates a top view of another embodiment, and FIG. 5B schematically illustrates a bottom view of another embodiment.

Figure 6A:
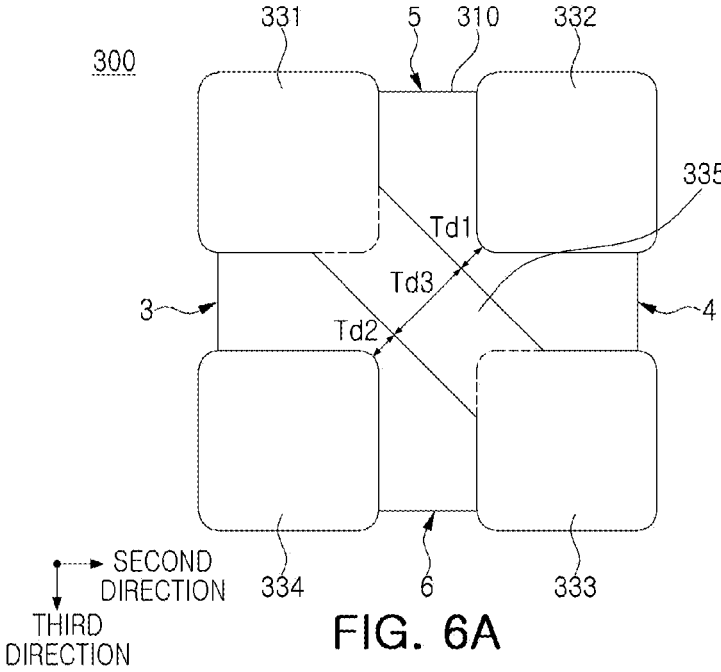
FIG. 6A schematically illustrates a top view of another embodiment, and FIG. 6B schematically illustrates a bottom view of another embodiment.
Figure 6B:
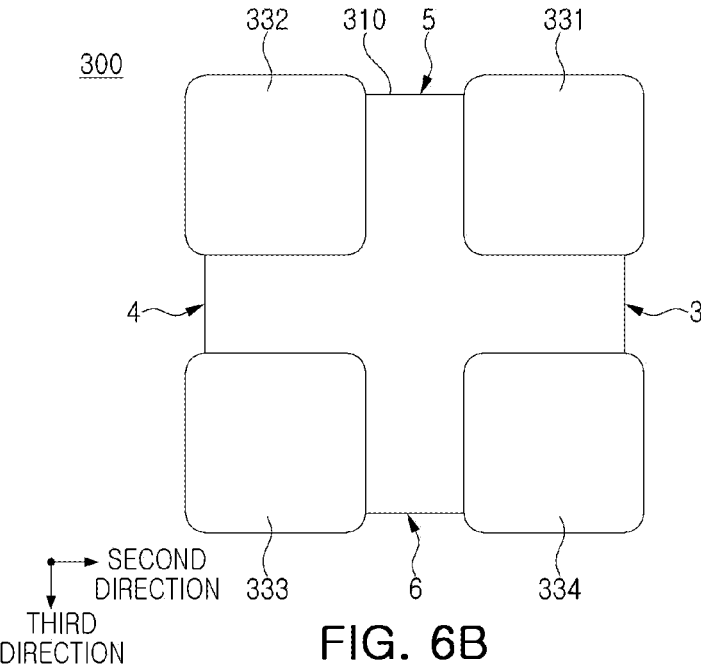

FIG. 6A schematically illustrates a top view of another embodiment, and FIG. 6B schematically illustrates a bottom view of another embodiment.

FIGS. 7A to 7D schematically illustrate cross-sectional views of an internal electrode including a lead-out portion according to another embodiment.

Figure 8A:
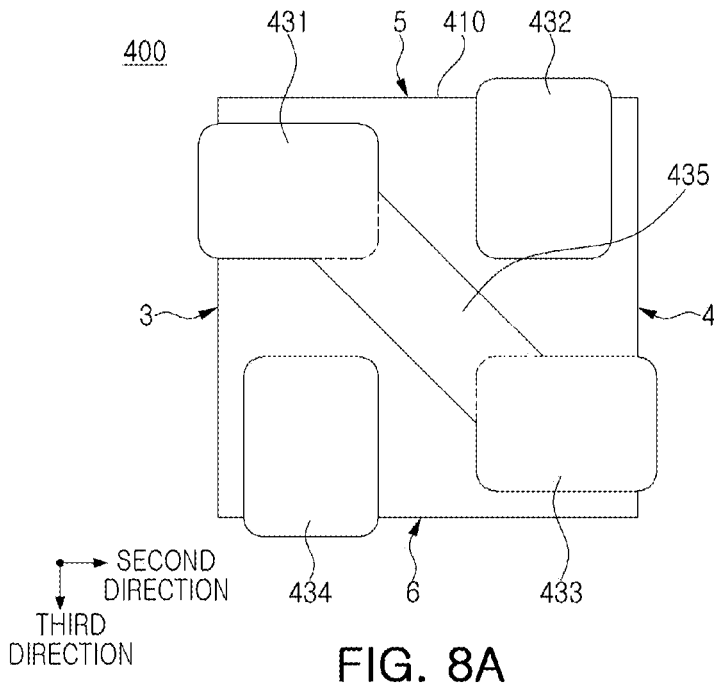
FIG. 8A schematically illustrates a top view of another embodiment, and FIG. 8B schematically illustrates a bottom view of another embodiment.
Figure 8B:
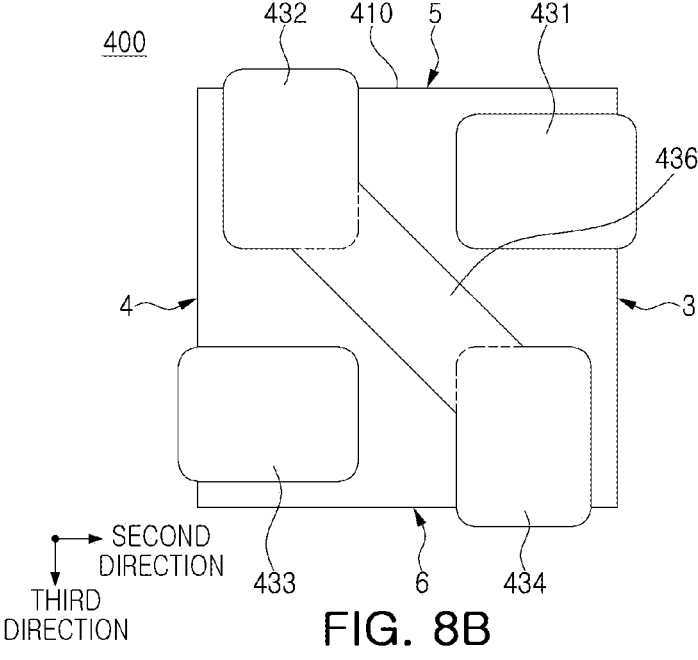

FIG. 8A schematically illustrates a top view of another embodiment, and FIG. 8B schematically illustrates a bottom view of another embodiment.

FIGS. 9A to 9D schematically illustrate cross-sectional views of an internal electrode including a lead-out portion according to another embodiment.

Figure 10A:
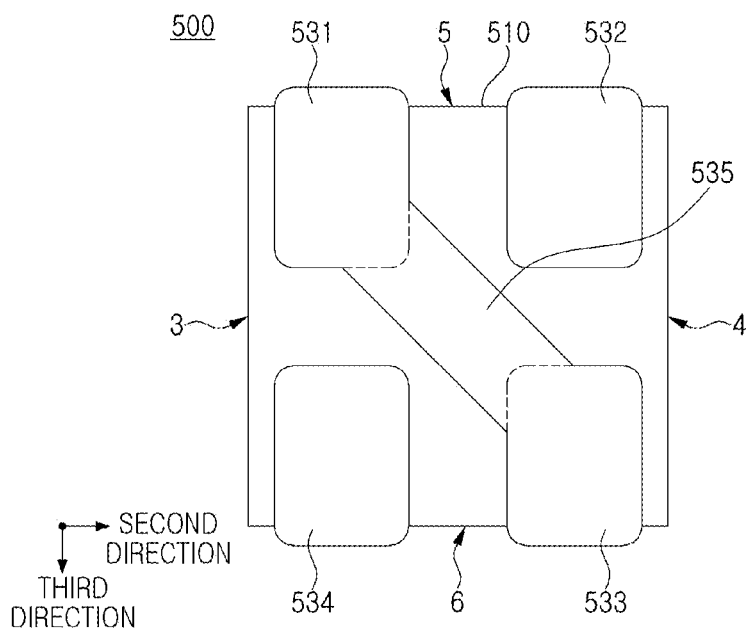
FIG. 10A schematically illustrates a top view of another embodiment, and FIG. 10B schematically illustrates a bottom view of another embodiment.
Figure 10B:
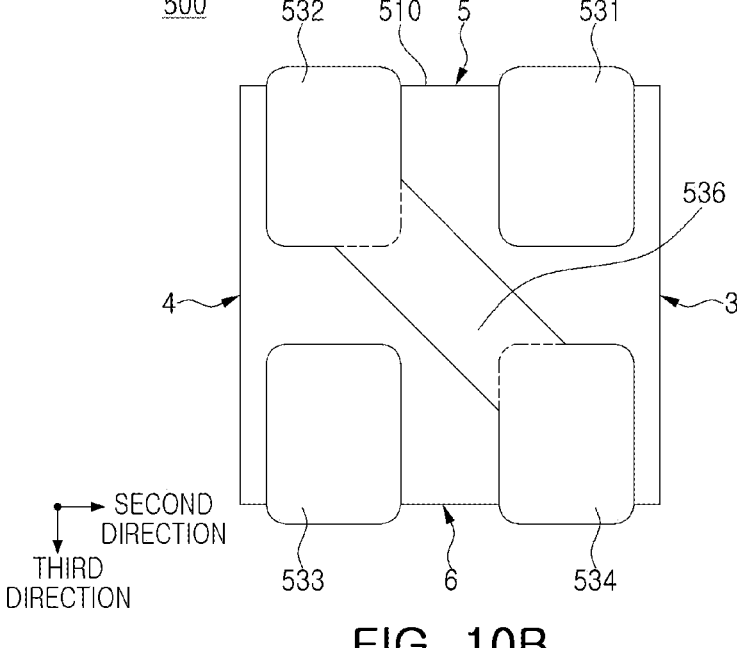

FIG. 10A schematically illustrates a top view of another embodiment, and FIG. 10B schematically illustrates a bottom view of another embodiment.

FIGS. 11A to 11D schematically illustrate cross-sectional views of an internal electrode including a lead-out portion according to another embodiment.

Hereinafter, referring to FIGS. 1 to 11D, a multilayer electronic component according to an embodiment will be described in detail. However, although a multilayer ceramic capacitor is described as an example of a multilayer electronic component, the present disclosure may be applied to various electronic products using a dielectric composition, inductors, piezoelectric elements, varistors, or thermistors.

A multilayer electronic component 100 according to an embodiment may include a body 10 including a dielectric layer 111 and internal electrodes 121, 122, 123, and 124 disposed alternately with the dielectric layer 111 in a first direction, and having first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3 and 4 and opposing each other in a third direction; and external electrodes 131, 132, 133, 134, and 135 disposed on the body 110. The internal electrodes 121, 122, 123, and 124 are connected to the external electrodes 131, 132, 133, 134, and 135 through lead-out portions 121a, 122b, 123c, and 124d. The external electrodes 131, 132, 133, 134, and 135 may include first to fourth external electrodes 131, 132, 133, and 134 that are spaced apart from each other, and include a first connection electrode 135 connecting the first and third external electrodes 131 and 133. The first connection electrode 135 may include a conductive material.

The body 110 may have the dielectric layers 111 and the internal electrodes 121, 122, 123, and 124 alternately stacked.

In more detail, the body 110 may include a capacitance forming portion disposed inside the body 110 and including a first internal electrode 121, a second internal electrode 122, a third internal electrode 123, and a fourth internal electrode 124 stacked in the first direction with the dielectric layer 111 therebetween to form capacitance.

In this case, the first to fourth internal electrodes 121, 122, 123, and 124 may be defined as one pattern. In detail, the first to fourth internal electrodes 121, 122, 123, and 124 may be disposed sequentially in the first direction, but are not particularly limited thereto, and may be disposed randomly in the first direction, but may form a pattern that repeats periodically.

Although the detailed shape of the body 110 is not particularly limited, as illustrated, the body 110 may have a hexahedral shape or a shape similar thereto. Due to shrinkage of the ceramic particles included in the body 110 during firing, the body 110 may have a substantially hexahedral shape, although it does not have a perfectly straight hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3 and 4 and opposing each other in the third direction.

The plurality of dielectric layers 111 forming the body 110 are in a fired state, and the boundary between adjacent dielectric layers 111 will be unified to the extent that it is difficult to confirm without using a scanning electron microscope (SEM).

The raw material forming the dielectric layer 111 is not limited as long as sufficient capacitance may be obtained. In general, a perovskite $(ABO_3)$-based material may be used, and for example, a barium titanate-based material, a lead composite perovskite-based material, a strontium titanate-based material or the like may be used. The barium titanate-based material may include $BaTiO_3$-based ceramic particles. As an example of the ceramic particles, $BaTiO_3$, or $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$ in which calcium (Ca), zirconium (Zr) or the like is partially solid-solubilized in $BaTiO_3$, may be provided.

In addition, various ceramic additives, organic solvents, binders, dispersants, and the like may be added to powder such as barium titanate $(BaTiO_3)$, as a raw material forming the dielectric layer 111 according to the usage of the present disclosure.

The thickness td of the dielectric layer 111 does not need to be particularly limited.

However, to more easily obtain miniaturization and high capacitance of the multilayer electronic component, the thickness of the dielectric layer 111 may be 0.6 μm or less, in detail, 0.4 μm or less.

In this case, the thickness td of the dielectric layer 111 may indicate the thickness td of the dielectric layer 111 disposed between the first and second internal electrodes 121 and 122.

On the other hand, the thickness td of the dielectric layer 111 may refer to the size of the dielectric layer 111 in the first direction. Also, the thickness td of the dielectric layer 111 may indicate the average thickness td of the dielectric layer 111 and may refer to the average size of the dielectric layer 111 in the first direction.

The average size of the dielectric layer 111 in the first direction may be measured by scanning the image of the cross-section of the body 110 in the first and second directions with a scanning electron microscope (SEM) at 10,000 magnification. In more detail, the average size of one dielectric layer 111 in the first direction may refer to an average value calculated by measuring the size of one dielectric layer 111 in the first direction at 30 equally spaced points in the second direction in the scanned image. The 30 equally spaced points may be designated in the capacitance forming portion. Additionally, if this average value measurement is expanded to 10 dielectric layers 111 and the average value is measured, the average size of the dielectric layers 111 in the first direction may be further generalized.

The internal electrodes 121, 122, 123, and 124 may be alternately stacked with the dielectric layer 111.

The internal electrodes 121, 122, 123, and 124 may include the first internal electrode 121, the second internal electrode 122, the third internal electrode 123, and the fourth internal electrode 124, and the first to fourth internal electrodes 121, 122, 123, and 124 may be alternately disposed to face each other with the dielectric layer 111 constituting the body 110 and interposed therebetween. The first to fourth internal electrodes 121, 122, 123, and 124 may be electrically separated from each other by the dielectric layer 111 disposed therebetween in the first direction.

At this time, the body 110 may be formed by alternately stacking and then firing a first ceramic green sheet with a first internal electrode pattern printed thereon, a second ceramic green sheet with a second internal electrode pattern printed thereon, a third ceramic green sheet with a third internal electrode pattern printed thereon, and a fourth ceramic green sheet with a fourth internal electrode pattern printed thereon. In this case, the first to fourth internal patterns may be formed by applying internal electrode paste, and may become the first to fourth internal electrodes 121, 122, 123, and 124 after firing.

Materials forming the internal electrodes 121, 122, 123, and 124 are not particularly limited, and materials with excellent electrical conductivity may be used. For example, the internal electrodes 121, 122, 123, and 124 may include at least one of nickel (Ni), copper (Cu), palladium (Pd), silver (Ag), gold (Au), platinum (Pt), tin (Sn), tungsten (W), titanium (Ti) and alloys thereof.

Additionally, in the case of the internal electrodes 121, 122, 123, and 124, an internal electrode pattern may be formed by printing a conductive paste for internal electrodes, containing at least one of nickel (Ni), copper (Cu), palladium (Pd), silver (Ag), gold (Au), platinum (Pt), tin (Sn), tungsten (W), titanium (Ti) and alloys thereof, on a ceramic green sheet. The printing method for the conductive paste for internal electrodes may be screen printing or gravure printing, but is not limited thereto.

On the other hand, the thickness te of the internal electrodes 121, 122, 123, and 124 does not need to be particularly limited.

However, to more easily obtain miniaturization and high capacitance of multilayer electronic components, the thickness of the internal electrodes 121, 122, 123, and 124 may be 0.6 μm or less, and in more detail, 0.4 μm or less.

In this case, a thickness te of the internal electrodes 121, 122, 123, and 124 may refer to the size of the internal electrodes 121, 122, 123, and 124 in the first direction. In addition, the thickness te of the internal electrodes 121, 122, 123, and 124 may refer to the average thickness te of the internal electrodes 121, 122, 123, and 124, and may refer to the average size of the internal electrodes 121, 122, 123, and 124 in the first direction.

The average size of the internal electrodes 121, 122, 123, and 124 in the first direction may be measured by scanning the image of the cross-section of the body 110 in the first and second directions using a scanning electron microscope (SEM) at 10,000 magnification. In more detail, the average size of one internal electrode in the first direction may be an average value calculated by measuring the size of one internal electrode in the first direction at 30 equally spaced points in the second direction in the scanned image. The 30 equally spaced points may be designated in the capacitance forming portion. In addition, if this average value measurement is extended to the 10 internal electrodes 121, 122, 123, and 124 and the average value is measured, the average size of the internal electrodes 121, 122, 123, and 124 in the first direction may be further generalized.

The external electrodes 131, 132, 133, 134, 135, and 136 may be disposed on the body 110 and connected to the internal electrodes 121, 122, 123, and 124.

The external electrodes 131, 132, 133, 134, 135, and 136 may include a first external electrode 131, a second external electrode 132, a third external electrode 133, and a fourth external electrode 134, and may be respectively disposed to be spaced apart from each other on the body 110.

In addition, the external electrodes 131, 132, 133, 134, 135, and 136 may include connection electrodes 135 and 136 connecting at least two of the first to fourth external electrodes 131, 132, 133, and 134. When there are a plurality of connection electrodes, respective connection electrodes may be connected to different external electrodes, and a detailed description thereof will be provided later.

The external electrodes 131, 132, 133, 134, 135, and 136 may be formed using any material as long as it has electrical conductivity, such as metal. A detailed material thereof may be determined considering electrical properties, structural stability, or the like, and further, the external electrodes may have a multi-layer structure.

For example, the external electrodes 131, 132, 133, 135, and 136 may include an electrode layer disposed on the body 110 and a plating layer disposed on the electrode layer.

For a more detailed example of the electrode layer, the electrode layer may be a fired electrode containing a conductive metal and glass, or may be a resin-based electrode containing a conductive metal and resin.

Additionally, the electrode layer may be in the form of a fired electrode and a resin-based electrode sequentially formed on the body 110.

Additionally, the electrode layer may be formed by transferring a sheet containing a conductive metal onto the body 110, or may be formed by transferring a sheet containing a conductive metal onto a fired electrode.

The conductive metal used in the electrode layer is not particularly limited as long as it is a material that may be electrically connected to the internal electrodes 121, 122, 123, and 124 to form capacitance, and for example, may include at least one selected from the group consisting of nickel (Ni), copper (Cu), palladium (Pd), silver (Ag), gold (Au), platinum (Pt), tin (Sn), tungsten (W), titanium (Ti) and alloys thereof. The electrode layer may be formed by applying a conductive paste prepared by adding a glass frit to the conductive metal powder and then firing the same.

The plating layer may play a role in improving mounting characteristics.

The type of plating layer is not particularly limited, and may be a single plating layer containing at least one of nickel (Ni), tin (Sn), palladium (Pd), and alloys thereof, or may be formed of multiple layers.

For a more detailed example of the plating layer, the plating layer may be a Ni plating layer or a Sn plating layer, and may be in the form in which a Ni plating layer and a Sn plating layer may be formed sequentially on the electrode layer and may also be in the form in which the Sn plating layer, Ni plating layer, and Sn plating layer are formed sequentially. Additionally, the plating layer may include a plurality of Ni plating layers and/or a plurality of Sn plating layers.

On the other hand, MLCC is also widely used for decoupling to remove noise from electrical signals within a set due to excellent high-frequency characteristics thereof (low ESL).

Additionally, to resolve noise in high-speed integrated circuits (ICs), a land side capacitor (LSC) may be applied adjacent to the IC, and it is known that LSC requires low thickness and high frequency characteristics. To reduce ESL, it may be important to significantly reduce the number of magnetic flux linkages per unit current in the high frequency region. To this end, various methods are used to prevent this problem, such as controlling the formation and structure in a manner of significantly reducing the current loop or disposing the internal and external electrodes in a direction that may cancel out the magnetic field.

As mentioned above, the LSC is generally placed under the IC substrate, and thus has a low thickness and requires low ESL characteristics. In this case, the LSC is mounted in the place from which the solder ball was removed at the bottom of the substrate, and LICC type capacitors were mainly used, but the need for capacitors with a square form-factor is gradually increasing.

Accordingly, a structure capable of obtaining low ESL in an embodiment may have the effect of improving the ease of measuring capacitance and the strength of multilayer electronic components, by designing a connection electrode that includes an internal electrode including a lead-out portion and may be electrically connected between the external electrodes. In addition, since the appearance may be easily distinguished, the effect of making it more convenient to distinguish between the top and bottom during mounting may be provided.

The external electrodes 131, 132, 133, 134, 135, and 136 include first to fourth external electrodes 131, 132, 133, and 134 that are spaced apart from each other, and may include connection electrodes 135 and 136 connecting at least two external electrodes among the first to fourth external electrodes 131, 132, 133, and 134.

At this time, the connection electrodes 135 and 136 may include a conductive material, and as mentioned above, may be formed using any material as long as it has electrical conductivity, such as metal or the like. A detailed material thereof may be determined considering electrical properties, structural stability, or the like, and further, the connection electrodes may have a multi-layer structure.

The conductive material included in the connection electrodes 135 and 136 does not need to be the same as the conductive material included in the first to fourth external electrodes 131, 132, 133, and 134, and may be formed of different conductive materials or may include different conductive materials. At this time, all conductive materials included in the first to fourth external electrodes 131, 132, 133, and 134 and all conductive materials included in the connection electrodes 135 and 136 may be different, which may include cases containing only partially overlapping materials.

For example, when the first to fourth external electrodes 131, 132, 133, and 134 contain copper (Cu), the connection electrodes 135 and 136 may contain copper (Cu) and nickel (Ni), or may not contain copper (Cu) but may contain nickel (Ni).

In more detail, the connection electrodes 135 and 136 may include a first connection electrode 135 disposed on the second surface 2 of the body and connected to the first and third external electrodes 131 and 132, or may include a second connection electrode 136 disposed on the first surface 1 of the body and connected to the second and fourth external electrodes 132 and 134. For example, depending on the structure of the multilayer electronic component 100, the connection electrodes may include at least one of the first and second connection electrodes 135 and 136, and may include both first and second connection electrodes 135 and 136.

Different voltages may be applied to the first and second connection electrodes 135 and 136, and voltage measurement of capacitance may be facilitated by applying different voltages.

For example, in the case in which the first to fourth internal electrodes 121, 122, 123, and 124 respectively include first to fourth lead-out portions 121a, 122b, 123c, and 124d, and are respectively connected to the first to fourth external electrodes 131, 132, 133 and 134, when two of the first to fourth external electrodes 131, 132, 133, and 134 are connected to the first connection electrode 135 and when the remaining two external electrodes that are not connected to the first connection electrode 135 are connected to the second connection electrode 136, measurement of capacitance may be facilitated by applying different voltages to the first and second connection electrodes 135 and 136. In this case, applying different voltages to the first and second connection electrodes 135 and 136 does not only mean applying a direct voltage to the first and second connection electrodes 135 and 136, and includes cases where voltage is applied to the external electrode connected to the first and second connection electrodes 135 and 136, so that the same electrical voltage is applied to the connected electrodes.

In detail, the first connection electrode 135 may be structurally and electrically connected to the first and third external electrodes 131 and 133, and may have substantially the same width, and in addition, may be desirable to have a straight structure, but it is not particularly limited thereto, and any structure that may be electrically connected, such as a curved shape or a stepped shape, may be applied.

At this time, the shortest distances from the first connection electrode 135 to the second and fourth external electrodes 132 and 134 are defined as Td1 and Td2, respectively, and when defining the width of the first connection electrode 135 as Td3, $90 \, \mu m \leq Td1$, $90 \, \mu m \leq Td2$, and $0 \, \mu m < Td3$ may be satisfied.

In this case, when the width of the first connection electrode 135 has substantially the same width, the average value of widths measured at five equally spaced points in the first connection electrode 135 may be defined as the width or average width of the first connection electrode 135. On the other hand, when the first connection electrode 135 does not have substantially the same width or when measurement is difficult, the larger value of the sizes of the first connection electrode 135 in a straight line direction parallel to the shortest distances from the first connection electrode 135 to the second and fourth external electrodes 132 and 134 may be defined as the width of the first connection electrode 135.

On the other hand, when $90 \, \mu m \leq Td1$, $90 \, \mu m \leq Td2$, and $0 \, \mu m < Td3$ are satisfied, since the electrical connectivity between the first and third external electrodes 131 and 133 is not deteriorated, capacitance may be easily measured, and the mechanical strength may be sufficient to prevent defects in the multilayer electronic component 100. Additionally, short circuits may be prevented.

On the other hand, in the case of $Td1 < 90 \, \mu m$ or $Td2 < 90 \, \mu m$, the separation distance between the first connection electrode 135 and the second external electrode 132 or the fourth external electrode 134 is relatively short, and thus there is a risk of electrical connection or short circuit. The upper limit values of Td1 and Td2 are not particularly limited and may be determined by the size of the multilayer electronic component or Td3.

Since Td3 is sufficient to electrically connect the first and third external electrodes 131 and 133, the lower limit value is not particularly limited and may be, for example, greater than $0 \, \mu m$. On the other hand, the upper limit value of Td3 is also not particularly limited and may be determined by the size of the multilayer electronic component, Td1 or Td2.

The second connection electrode 136 may be structurally and electrically connected to the second and fourth external electrodes 132 and 134, and may have substantially the same width. In addition, in detail, the second connection electrode 136 may have a straight structure, but it is not particularly limited to this, and any structure that may be electrically connected, such as a curved shape or a stepped shape, may be applied.

At this time, when the shortest distances from the second connection electrode 136 to the first and third external electrodes 131 and 133 are defined as Bd1 and Bd2, respectively, and the width of the second connection electrode 136 is defined as Bd3, $90 \, \mu m \leq Bd1$, $90 \, \mu m \leq Bd2$, and $0 \, \mu m < Bd3$ may be satisfied.

In this case, when the width of the second connection electrode 136 has substantially the same width, the average value of widths measured at five equally spaced points in the second connection electrode 136 may be defined as the width or average width of the second connection electrode 136. On the other hand, if the second connection electrode 136 does not have substantially the same width or is difficult to measure, the larger value of the sizes of the first connection electrode 135 in a straight line direction parallel to the shortest distances from the first connection electrode 135 to the second and fourth external electrodes 132 and 134 may be defined as the width of the first connection electrode 135.

On the other hand, when $90 \, \mu m \leq Bd1$, $90 \, \mu m \leq Bd2$, and $0 \, \mu m < Bd3$ are satisfied, since the electrical connectivity between the second and fourth external electrodes 132 and 134 is not deteriorated, capacitance may be easily measured, and the mechanical strength may be sufficient to prevent defects in the multilayer electronic component 100. Additionally, short circuits may be prevented.

On the other hand, in the case of $Bd1 < 90 \, \mu m$ or $Bd2 < 90 \, \mu m$, the separation distance between the second connection electrode 136 and the first external electrode 131 or the third external electrode 133 is relatively short, and thus there is a risk of electrical connection or short circuit. The upper limit values of Bd1 and Bd2 are not particularly limited and may be determined by the size of the multilayer electronic component or Bd3.

Since Bd3 is sufficient to electrically connect the second and fourth external electrodes 132 and 134, the lower limit value is not particularly limited and may be, for example, greater than $0 \, \mu m$. On the other hand, the upper limit value of Bd3 is also not particularly limited and may be determined by the size of the multilayer electronic component, Bd1 or Bd2.

On the other hand, for example, when the first and second connection electrodes 141 and 142 have a straight structure, for example, the first and second connection electrodes 141 and 142 may intersect diagonally when projected from a plan view.

The first to fourth external electrodes 131, 132, 133, and 134 may be disposed on the body 110 and spaced apart from each other.

In more detail, the first external electrode 131 is disposed on at least one of the third and fifth surfaces 3 and 5, the second external electrode 132 is disposed on at least one of the fourth and fifth surfaces 4 and 5, the third external electrode 133 is disposed on at least one of the fourth and sixth surfaces 4 and 6, and the fourth external electrode 134 may be disposed on at least one of the third and sixth surfaces 3 and 6.

On the other hand, the internal electrode according to an embodiment may include first to fourth internal electrodes 121, 122, 123, and 124, and may be connected to the first to fourth external electrodes 131, 132, 133, and 134 through the first to fourth lead-out portions 121a, 122b, 123c, and 124d, respectively.

In more detail, the first internal electrode 121 may be connected to the first external electrode 131 through the first lead-out portion 121a, the second internal electrode 122 may be connected to the second external electrode 132 through the second lead-out portion 122b, the third internal electrode 123 may be connected to the third external electrode 133 through the third lead-out portion 123c, and the fourth internal electrode 124 may be connected to the fourth external electrode 134 through the fourth lead-out portion 124d.

In detail, the first internal electrode 121 may be connected to the first external electrode 131 without being connected to the second to fourth external electrodes 132, 133, and 134, the second internal electrode 122 may be connected to the second external electrode 132 without being connected to the first, third, and fourth external electrodes 131, 133, and 134, the third internal electrode 123 may be connected to the third external electrode 133 without being connected to the first, second, and fourth external electrodes 131, 132, and 134, and the fourth internal electrode 124 may be connected to the fourth external electrode 134 without being connected to the first to third external electrodes 131, 132, and 133.

as the first to fourth internal electrodes 121, 122, 123, and 124 are connected to the first to fourth external electrodes 131, 132, 133, and 134 through the first to fourth lead-out portions 121a, 122b, 123c, and 124d, respectively, low ESL characteristics may be implemented in the high frequency range.

In the present disclosure, the internal electrodes 121, 122, 123, and 124 may be comprised of the lead-out portions 121a, 122b, 123c, and 124d and the main portion (no designation) excluding the lead-out portions 121a, 122b, 123c, and 124d.

In more detail, the first to fourth lead-out portions 121a, 122b, 123c, and 124d may be regions in which the first to fourth internal electrodes 121, 122, 123, and 124 do not overlap in the first direction. The first to fourth lead-out portions 121a, 122b, 123c, and 124d do not overlap in the first direction and may thus not form capacitance.

Additionally, the main portion may be an area where the first to fourth internal electrodes 121, 122, 123, and 124 overlap in the first direction, and capacitance may be formed as the main portion overlaps in the first direction, and this area may be referred to as a capacitance forming portion.

In more detail, the main portion may include a first main portion, which is an area excluding the first lead-out portion 121a in the first internal electrode 121, a second main portion, which is an area excluding the second lead-out portion 122b in the second internal electrode 122, a third main portion, which is an area excluding the third lead-out portion 123c in the third internal electrode 123, and a fourth main portion, which is an area excluding the fourth lead-out portion 124d in the fourth internal electrode 124.

In detail, the internal electrode may include a lead-out portion, which is an area that does not form capacitance, and a main portion, which is an area that forms capacitance.

On the other hand, the shape of the lead-out portion may vary. For example, the first lead-out portion may be in contact with a portion of at least one of the third and fifth surfaces 3 and 5, the second lead-out portion may be in contact with a portion of at least one of the fourth and fifth surfaces 4 and 5, the third lead-out portion may be in contact with a portion of at least one of the fourth and sixth surfaces 4 and 6, and the fourth lead-out portion may be in contact with a portion of at least one of the third and sixth surfaces 3 and 6.

For example, it may be sufficient for the first lead-out portion to be in contact with a portion of at least one of the third and fifth surfaces 3 and 5, and it may not be necessary for the first lead-out portion to be in contact with the third and fifth surfaces 3 and 5 simultaneously, which may include cases where it contacts the third and fifth surfaces 3 and 5 simultaneously. This description may be equally applied to the second to fourth lead-out portions.

For another example, the second internal electrode 322 may further include a second additional lead-out portion 332d connected to the fourth external electrode 334, and the fourth internal electrode may further include a fourth additional lead-out portion connected to the second external electrode.

For example, the second internal electrode may be connected to the second external electrode through the second lead-out portion and may be connected to the fourth external electrode through the second additional lead-out portion, and the fourth internal electrode may be connected to the fourth external electrode through the fourth lead-out portion and may be connected to the second external electrode through the fourth additional lead-out portion.

In detail, the first internal electrode is connected to the first external electrode, the second and fourth internal electrodes may be connected simultaneously with the second external electrode and the fourth external electrode, and the third internal electrode may be connected to the third external electrode.

For example, when the second and fourth internal electrodes are connected simultaneously with the second and fourth external electrodes, respective lead-out portions included in the second and fourth internal electrodes may include an overlapping area between the second and fourth internal electrodes. In this case, the shapes of the second internal electrode and the fourth internal electrode may be substantially the same, but are not particularly limited thereto.

When the first to fourth internal electrodes are sequentially disposed, the first internal electrode, the second internal electrode, the third internal electrode, and the fourth internal electrode may be sequentially disposed.

Accordingly, the first to fourth external electrodes 131, 132, 133, and 134 may be in contact with the first to fourth lead-out portions 121a, 122b, 123c, and 124d, respectively, and may be disposed to cover the first to fourth lead-out portions 121a, 122b, 123c, and 124d, respectively.

In this case, "disposed to cover" means that the external electrodes 131, 132, 133, and 134 are disposed such that the first to fourth lead-out portions 121a, 122b, 123c, and 124d in contact with at least one surface of the body 110 are not exposed externally.

In more detail, the first external electrode 131 is in contact with the first lead-out portion 121a and is disposed to cover the first lead-out portion 121a, the second external electrode 132 is in contact with the second lead-out portion 122b and is disposed to cover the second lead-out portion 122b, the third external electrode 133 is in contact with the third lead-out portion 123c and is disposed to cover the third lead-out portion 123c, and the fourth external electrode 134 is in contact with the fourth lead-out portion 124d and may be disposed to cover the fourth lead-out portion 124d.

It is sufficient for the first to fourth external electrodes 131, 132, 133, and 134 to be disposed on at least one of the third to sixth surfaces 3, 4, 5, and 6 of the body. However, for ease of mounting on the board, excellent moisture resistance reliability, and improvement of mechanical strength, in detail, the first to fourth external electrodes 131, 132, 133, and 134 may be disposed to extend on a portion of the first surface 1 and the second surface 2 of the body 110.

There is no need to specifically limit the size of the multilayer electronic component 100.

However, to simultaneously obtain the effect of reducing Low ESL in the high frequency range, improving moisture resistance reliability, improving mechanical strength, and convenience of capacitance measurement, the effect according to the present disclosure may be more noticeable in the multilayer electronic component 100 with a form-factor shape, which has an ultra-small size and in which the length (size in the second direction) and the width (size in the third direction) of the multilayer electronic component 100 are substantially the same, such as 0606 (length×width: 0.6 mm×0.6 mm) size or lower.

In this case, the fact that the length and width are substantially the same does not mean that they are completely the same, but includes an allowable error range, and in detail, may mean that the difference between the length and width is 10% or less, in more detail, the difference between the length and width is 5% or less. When the length and width are substantially the same, current loop improvement may be possible, and a multilayer electronic component 100 with low ESL may be more easily obtained.

Hereinafter, the present disclosure will be described in more detail through examples, but these are intended to aid detailed understanding of the present disclosure and the scope of the present disclosure is not limited by the examples.

First Embodiment

In describing the multilayer electronic component 100, which is a first embodiment, with reference to FIGS. 1 to 3B, the first internal electrode 121 may be connected to the first external electrode 131 disposed to cover the first lead-out portion 121a over a portion of the third surface 3 and a portion of the fifth surface 5, through the first lead-out portion 121a disposed to contact a portion of the third surface 3 and a portion of the fifth surface 5. The second internal electrode 122 may be connected to the second external electrode 131 disposed to cover the second lead-out portion 122b over a portion of the fourth surface 4 and a portion of the fifth surface 5, through the second lead-out portion 122b disposed to contact a portion of the fourth surface 4 and a portion of the fifth surface 5. The third internal electrode 123 may be connected to the third external electrode 133 disposed to cover the third lead-out portion 123c over a portion of the fourth surface 4 and a portion of the sixth surface 6, through the third lead-out portion 123c disposed to contact a portion of the fourth surface 4 and a portion of the sixth surface 6. The fourth internal electrode 124 may be connected to the fourth external electrode 134 disposed to cover the fourth lead-out portion 124d over a portion of the third surface 3 and a portion of the sixth surface 6, through the fourth lead-out portion 124d disposed to contact a portion of the third surface 3 and a portion of the sixth surface 6. Therefore, the first to fourth internal electrodes 121, 122, 123, and 124 may be connected to the first to fourth external electrodes 131, 132, 133, and 134, respectively.

At this time, the first external electrode 131 and the third external electrode 132 are connected by the first connection electrode 135 disposed on the second surface 2, and the second external electrode 132 and the fourth external electrode 134 are connected by the second connection electrode 136 disposed on the first surface 1. Accordingly, the first external electrode 131, the third external electrode 132, and the first connection electrode 135 are connected, and the second external electrode 132, the fourth external electrode 134, and the second connection electrode 136 are connected, thereby measuring capacitance by applying different voltages respectively.

For example, the capacitance of the multilayer electronic component 100 may be measured by applying a first voltage to the first external electrode 131 and a second voltage to the second external electrode 132.

If there are no first and second connection electrodes 135 and 136, there are many cases in which different voltages are respectively applied to any two of the first to fourth external electrodes 131, 132, 133, and 134, and thus the measured value of capacitance may vary or be inaccurate. However, according to an embodiment of the present disclosure, there is an advantage in that capacitance may be conveniently measured by applying voltage to two places.

In one embodiment, the first connection electrode 135 may extend between the first and third external electrodes 131 and 133 in a first diagonal direction with respect to the third to sixth surfaces 3 to 6 of the body 110. The second connection electrode 136 may extend between the second and fourth external electrodes 132 and 134 in a second diagonal direction with respect to the third to sixth surfaces 3 to 6 of the body 110. As such, the first and second connection electrodes 135 and 136 may intersect with each other in a view from the first direction.

Second Embodiment

In describing a multilayer electronic component 200, which is a second embodiment, with reference to FIGS. 4 and 5B, other configurations may be the same or similar to the multilayer electronic component 100 of the first embodiment, and the shapes of first to fourth external electrodes 231, 232, 233, and 234 may be different from the first to fourth external electrodes 131, 132, 133, and 134 of the first embodiment. In detail, the shape of the external electrode may be applied as a quadrangle or a triangle based on the top or bottom view, but even if the shape is different, appropriate design and change are possible without departing from the scope of the present disclosure intended to resolve the problems.

Third Embodiment

In describing a multilayer electronic component 300, which is a third embodiment, with reference to FIGS. 6A and 7C, a first internal electrode 321 may be connected to a first external electrode 331 disposed to cover a first lead-out portion 321a over a portion of the fourth surface 4 and a portion of the fifth surface 5, through the first lead-out portion 321a disposed to contact a portion of the fourth surface 4 and a portion of the fifth surface 5. A second internal electrode 322 may be connected to a second external electrode 331 disposed to cover a second lead-out portion 322b over a portion of the fourth surface 4 and a portion of the fifth surface 5, through the second lead-out portion 322*b* disposed to contact a portion of the fourth surface 4 and a portion of the fifth surface 5. Additionally, the second internal electrode 322 may be connected to a fourth external electrode 334 disposed to cover a second additional lead-out portion 322*d* over a portion of the third surface 3 and a portion of the sixth surface 6, through the second additional lead-out portion 322*d* disposed to contact a portion of the third surface 3 and a portion of the sixth surface 6. Accordingly, the second internal electrode 322 may be connected to the second external electrode 332 and the fourth external electrode 334 simultaneously. The third internal electrode 323 may be connected to a third external electrode 333 disposed to cover a third lead-out portion 323*c* over a portion of the third surface 3 and a portion of the sixth surface 6, through the third lead-out portion 323*c* disposed to contact a portion of the third surface 3 and a portion of the sixth surface 6.

Although not illustrated in the drawing, the fourth internal electrode may have the same shape as the second internal electrode 322. Accordingly, when the first to fourth internal electrodes are disposed sequentially, the internal electrodes may be stacked and disposed in a first direction, in the order of having the shapes of the first internal electrode 321, the second internal electrode 322, the third internal electrode 323, the second internal electrode 322, the first internal electrode 321, and the like.

At this time, since the second internal electrode 322 is connected to the second and fourth external electrodes 332 and 334, even if only the first connection electrode 335 is disposed on the second surface 2 of the body 310 and connected to the first and third external electrodes 331 and 333, the capacitance may be easily measured. For example, the second connection electrode 336 is not connected to the second and fourth external electrodes 332 and 334 because the second connection electrode 336 is not disposed on the first surface 1 of the body 310. For example, even if voltage is applied to the first external electrode 331 and the second external electrode 332, the capacitance of the first to fourth internal electrodes (321, 322, 323, and not illustrated) may be measured.

Fourth Embodiment

In describing a multilayer electronic component 400, which is a fourth embodiment, with reference to FIGS. 8A to 9D, a first internal electrode 421 may be connected to a first external electrode 431 disposed to cover a first lead-out portion 421*a* on a portion of the third surface 3 through the first lead-out portion 421*a* in contact with a portion of the third surface 3. A second internal electrode 422 may be connected to a second external electrode 432 disposed to cover a second lead-out portion 422*b* on a portion of the fifth surface 5 through the second lead-out portion 422*b* in contact with a portion of the fifth surface 5. A third internal electrode 423 may be connected to a third external electrode 433 disposed to cover a third lead-out portion 423*a* on a portion of the fourth surface 4 through the third lead-out portion 423*a* in contact with a portion of the fourth surface 4. A fourth internal electrode 424 may be connected to a fourth external electrode 434 disposed to cover a fourth lead-out portion 424*a* on a portion of the sixth surface 6 through the fourth lead-out portion 424*a* in contact with a portion of the sixth surface 6.

In this case, the first external electrode 431 and the third external electrode 432 are connected by a first connection electrode 435 disposed on the second surface 2, and the second external electrode 432 and the fourth external electrode 434 are connected by a second connection electrode 436 disposed on the first surface 1. Accordingly, the first external electrode 431, the third external electrode 432 and the first connection electrode 435 are connected, and the second external electrode 432, the fourth external electrode 434 and the second connection electrode 436 are connected. Therefore, capacitance may be measured by applying different voltages respectively.

Fifth Embodiment

In describing a multilayer electronic component 500, which is a fifth embodiment, with reference to FIGS. 10A to 11D, a first internal electrode 521 may be connected to a first external electrode 531 disposed to cover a first lead-out portion 521*a* on a portion of the fifth surface 5 through the first lead-out portion 521*a* in contact with a portion of the fifth surface 5. A second internal electrode 522 may be connected to a second external electrode 532 disposed to cover a second lead-out portion 522*b* on a portion of the fifth surface 5 through the second lead-out portion 522*b* in contact with a portion of the fifth surface 5. A third internal electrode 523 may be connected to a third external electrode 533 disposed to cover a third lead-out portion 523*c* on a portion of the sixth surface 6 through the third lead-out portion 523*c* in contact with a portion of the sixth surface 6. A fourth internal electrode 524 may be connected to a fourth external electrode 534 disposed to cover a fourth lead-out portion 524*d* on a portion of the sixth surface 6 through the fourth lead-out portion 524*d* in contact with a portion of the sixth surface 6.

In this case, the first external electrode 531 and the third external electrode 532 may be connected by a first connection electrode 535 disposed on the second surface 2, and the second external electrode 532 and the fourth external electrode 534 may be connected by a second connection electrode 536 disposed on the first surface 1. Accordingly, the first external electrode 531, the third external electrode 532, and the first connection electrode 535 are connected, and the second external electrode 532, the fourth external electrode 534, and the second connection electrode 536 are connected. Therefore, capacitance may be measured by applying different voltages respectively.

As set forth above, according to an embodiment, measurement of capacitance of multilayer electronic components may be facilitated.

Mechanical strength of multilayer electronic components may be improved.

The appearance of multilayer electronic components may be distinguished.

A multilayer electronic component having improved high-frequency characteristics (low ESL) may be provided.

Although the embodiments of the present disclosure have been described in detail above, the present disclosure is not limited by the above-described embodiments and the accompanying drawings, but is intended to be limited by the appended claims. Therefore, various forms of substitution, modification, and change will be possible by those skilled in the art within the scope of the technical spirit of the present disclosure described in the claims, which also falls within the scope of the present disclosure.

The expression 'an embodiment' used in this specification does not mean the same embodiment, and is provided to emphasize and describe different unique characteristics. However, an embodiment presented above is not excluded from being implemented in combination with features of another embodiment. For example, even if a matter described in one detailed embodiment is not described in another embodiment, it may be understood as a description related to another embodiment unless there is a description contradicting or contradicting the matter in another embodiment.

Terms used in this specification are only used to describe an embodiment, and are not intended to limit the present disclosure. In this case, singular expressions include plural expressions unless the context clearly indicates otherwise.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and an internal electrode alternately disposed with the dielectric layer in a first direction, and having a first surface and a second surface opposing each other in the first direction, a third surface and a fourth surface connected to the first and second surfaces and opposing each other in a second direction, a fifth surface and a sixth surface connected to the first to fourth surfaces and opposing each other in a third direction; and
an external electrode disposed on the body,
wherein the internal electrode is connected to the external electrode through a lead-out portion,
the external electrode includes first to fourth external electrodes spaced apart from each other, and includes a first connection electrode connecting the first and third external electrodes,
the first connection electrode includes a conductive material,
the internal electrode includes a first internal electrode connected to the first external electrode through a first lead-out portion, a second internal electrode connected to the second external electrode through a second lead-out portion, and a third internal electrode connected to the third external electrode through a third lead-out portion, and
the first internal electrode is physically separated from the second, third, and fourth external electrodes, and the third internal electrode is physically separated from the first, second, and fourth external electrodes.

2. The multilayer electronic component of claim 1, wherein the external electrode further includes a second connection electrode connecting the second and fourth external electrodes, and
the second connection electrode includes a conductive material.

3. The multilayer electronic component of claim 1, wherein, when shortest distances from the first connection electrode to the second and fourth external electrodes are defined as Td1 and Td2, respectively, and a width of the first connection electrode is defined as Td3, 90 μm≤Td1, 90 μm≤Td2, and 0 μm<Td3 are satisfied.

4. The multilayer electronic component of claim 2, wherein, when shortest distances from the second connection electrode to the first and third external electrodes are defined as Bd1 and Bd2, respectively, and a width of the second connection electrode is defined as Bd3, 90 μm≤Bd1, 90 μm≤Bd2, and 0 μm<Bd3 are satisfied.

5. The multilayer electronic component of claim 1, wherein the first external electrode is disposed on at least one of the third and fifth surfaces, the second external electrode is disposed on at least one of the fourth and fifth surfaces, the third external electrode is disposed on at least one of the fourth and sixth surfaces, and the fourth external electrode is disposed on at least one of the third and sixth surfaces.

6. The multilayer electronic component of claim 1, wherein the first connection electrode is disposed on the second surface.

7. The multilayer electronic component of claim 2, wherein the first connection electrode is disposed on the second surface, and the second connection electrode is disposed on the first surface.

8. The multilayer electronic component of claim 1, wherein the internal electrode further includes a fourth internal electrode connected to the fourth external electrode through a fourth lead-out portion.

9. The multilayer electronic component of claim 8, wherein the second internal electrode further includes a second additional lead-out portion connected to the fourth external electrode, and
the fourth internal electrode further includes a fourth additional lead-out portion connected to the second external electrode.

10. The multilayer electronic component of claim 1, wherein the multilayer electronic component has a difference of 10% or less between a size in the second direction and a size in the third direction.

11. A multilayer electronic component comprising:
a body including a dielectric layer and an internal electrode alternately disposed with the dielectric layer in a first direction, and having a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction; and
an external electrode disposed on the body,
wherein the internal electrode is connected to the external electrode through a lead-out portion,
the external electrode includes first to fourth external electrodes spaced apart from each other, a first connection electrode connecting the first and third external electrodes, and a second connection electrode connecting the second and fourth external electrodes,
the internal electrode includes a first internal electrode connected to the first external electrode through a first lead-out portion, a second internal electrode connected to the second external electrode through a second lead-out portion, and a third internal electrode connected to the third external electrode through a third lead-out portion, and
the first internal electrode is physically separated from the second, third, and fourth external electrodes, and the third internal electrode is physically separated from the first, second, and fourth external electrodes.

12. The multilayer electronic component of claim 11, wherein, when shortest distances from the first connection electrode to the second and fourth external electrodes are defined as Td1 and Td2, respectively, and a width of the first connection electrode is defined as Td3, 90 μm≤Td1, 90 μm≤Td2, and 0 μm<Td3 are satisfied, and
when shortest distances from the second connection electrode to the first and third external electrodes are defined as Bd1 and Bd2, respectively, and a width of the second connection electrode is defined as Bd3, 90 μm≤Bd1, 90 μm≤Bd2, and 0 μm<Bd3 are satisfied.

13. The multilayer electronic component of claim 11, wherein the internal electrode further includes a fourth internal electrode connected to the fourth external electrode through a fourth lead-out portion.

14. The multilayer electronic component of claim 11, wherein the first external electrode is disposed on at least one of the third and fifth surfaces, the second external electrode is disposed on at least one of the fourth and fifth surfaces, the third external electrode is disposed on at least one of the fourth and sixth surfaces, and the fourth external electrode is disposed on at least one of the third and sixth surfaces.

15. The multilayer electronic component of claim 11, wherein the first connection electrode is disposed on the second surface, and the second connection electrode is disposed on the first surface.

16. The multilayer electronic component of claim 11, wherein the multilayer electronic component has a difference of 10% or less between a size in the second direction and a size in the third direction.

17. A multilayer electronic component comprising:

a body including a dielectric layer and an internal electrode alternately disposed with the dielectric layer in a first direction, and having a first surface and a second surface opposing each other in the first direction, a third surface and a fourth surface connected to the first and second surfaces and opposing each other in a second direction, a fifth surface and a sixth surface connected to the first to fourth surfaces and opposing each other in a third direction; and an external electrode disposed on the body, wherein the internal electrode is connected to the external electrode through a lead-out portion, the external electrode includes first to fourth external electrodes spaced apart from each other, and includes a first connection electrode connecting the first and third external electrodes, the first connection electrode extends between the first and third external electrodes in a first diagonal direction with respect to the third to sixth surfaces of the body, the internal electrode includes a first internal electrode connected to the first external electrode through a first lead-out portion, a second internal electrode connected to the second external electrode through a second lead-out portion, and a third internal electrode connected to the third external electrode through a third lead-out portion, and the first internal electrode is physically separated from the second, third, and fourth external electrodes, and the third internal electrode is physically separated from the first, second, and fourth external electrodes.

18. The multilayer electronic component of claim 17, wherein the external electrode further includes a second connection electrode connecting the second and fourth external electrodes, and the second connection electrode extends between the second and fourth external electrodes in a second diagonal direction with respect to the third to sixth surfaces of the body.

19. The multilayer electronic component of claim 18, wherein the first and second connection electrodes intersect with each other in a view from the first direction.

20. The multilayer electronic component of claim 1, wherein the first connection electrode is integrally formed with the first and third external electrodes.

* * * * *